United States Patent
Sakai (10) Patent No.: US 10,899,300 B2
(45) Date of Patent: Jan. 26, 2021

(54) COLLISION DETECTION SENSOR (71) Applicant: DENSO CORPORATION, Kariya (JP)

(72) Inventor: Makoto Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 453 days.

(21) Appl. No.: 15/836,532

(22) Filed: Dec. 8, 2017

(65) Prior Publication Data
US 2018/0170298 A1 Jun. 21, 2018

(30) Foreign Application Priority Data
Dec. 16, 2016 (JP) .................................. 2016-244649

(51) Int. Cl.
*B60R 21/0134* (2006.01)
*B60R 21/0132* (2006.01)
*G01P 15/18* (2013.01)
*G01P 15/08* (2006.01)

(52) U.S. Cl.
CPC ...... *B60R 21/0134* (2013.01); *B60R 21/0132* (2013.01); *G01P 15/0891* (2013.01); *G01P 15/18* (2013.01); *B60R 2021/01325* (2013.01); *B60R 2021/01327* (2013.01)

(58) Field of Classification Search
CPC ............ B60R 21/0134; B60R 21/0132; B60R 2021/01325; B60R 2021/01327; G01P 15/0891; G01P 15/18
USPC ........................................................ 73/432.1
See application file for complete search history.

(56) References Cited

U.S. PATENT DOCUMENTS

| | | | | |
|---|---|---|---|---|
| 6,810,738 B2* | 11/2004 | Sakaguchi | ............ | G01P 15/123 73/510 |
| 6,953,993 B2* | 10/2005 | Yamaguchi | ......... | B81C 1/00269 257/704 |
| 9,235,937 B1* | 1/2016 | Weinberg | ................ | G07C 5/008 |
| 2004/0201464 A1* | 10/2004 | Oonishi | ................ | B60R 21/013 340/436 |
| 2007/0001678 A1* | 1/2007 | Oonishi | ................... | G01P 15/00 324/422 |
| 2009/0255335 A1* | 10/2009 | Fly | .......................... | G01P 15/18 73/493 |
| 2016/0146849 A1* | 5/2016 | Yaguchi | .............. | G01P 15/0802 73/514.35 |

FOREIGN PATENT DOCUMENTS

| JP | 2007-102558 | | 4/2007 |
|---|---|---|---|
| JP | 2008/096374 A | | 4/2008 |
| JP | 2008096374 A | * | 4/2008 |
| JP | 2011/226928 A | | 11/2011 |

\* cited by examiner

*Primary Examiner* — Marrit Eyassu
(74) *Attorney, Agent, or Firm* — Maschoff Brennan

(57) ABSTRACT

A collision detection sensor includes a sensor module which includes a first surface and a second surface facing each other. The first surface includes an acceleration detection element detecting a vehicle acceleration in one direction parallel thereto, and the second surface is formed with a first land and a second land. Among four corners of the second surface, one corner in a first pair of opposing corners is provided with the first land, and the other corner in the first pair of opposing corners is provided with the second land.

8 Claims, 10 Drawing Sheets

COLLISION DETECTION SENSOR

CROSS-REFERENCE TO RELATED APPLICATION

This application is based on and claims the benefit of priority from earlier Japanese Patent Application No. 2016-244649 filed Dec. 16, 2016, the description of which is incorporated herein by reference.

BACKGROUND

Technical Field

The present disclosure relates to a collision detection sensor for detecting acceleration in different directions, and in particular to a collision detection sensor favorably applied to an airbag system.

Related Art

Collision detection sensors that have been used for airbag systems detect acceleration in a plurality of directions including, specifically, an x-axis direction corresponding to the longitudinal direction of the vehicle, y-axis direction corresponding to the lateral direction of the vehicle, and z-axis direction corresponding to the vertical direction of the vehicle. When an acceleration exceeding a threshold is detected by such a collision detection sensor, the airbags are inflated to alleviate impact applied to the occupants.

Such a collision detection sensor can detect acceleration in a plurality of directions with the provision of different elements for respective directions. However, preparing different elements for respective directions may lead to increase in the number of types of elements to be produced and thus is not preferable. In this regard, a patent document JP 2007-40950 A, for example, discloses a sensor device that uses identically shaped chips, in each of which an acceleration detection element is formed, to reduce the number of types of chips to be produced. Specifically, this sensor device includes chips each having a square upper surface serving as an acceleration detection element for detecting acceleration in one direction, that is, x- or y-axis direction parallel to the upper surface. More specifically, the chips are mounted to a printed board with the mounting angle being changed by 90°, and with the wiring patterns on the printed board being made different depending on the angular positions of the chips. Thus, acceleration in the x- and y-axis directions can be detected using identically shaped chips.

As mentioned above, identically shaped chips can be used for detecting acceleration in the x- and y-axis directions. Accordingly, the number of types of chips to be produced can be reduced to only two, that is, one used for detecting acceleration in the x- or y-axis direction, and one used for detecting acceleration in the z-axis direction. In this way, the increase in the number of types of chips to be produced and the manufacturing cost can be reduced.

However, further simplification of such collision detection sensors is still sought. For further simplification, another structure of collision detection sensor is under development, that is, a structure from which the printed board is omitted (hereinafter, this structure is referred to as printed-boardless structure). Specifically, in this structure, a sensor module incorporating a chip formed with an acceleration detection element (hereinafter, this sensor module is referred to as G module) is directly bonded to a set of identically shaped terminals made of metal.

Figure 10:
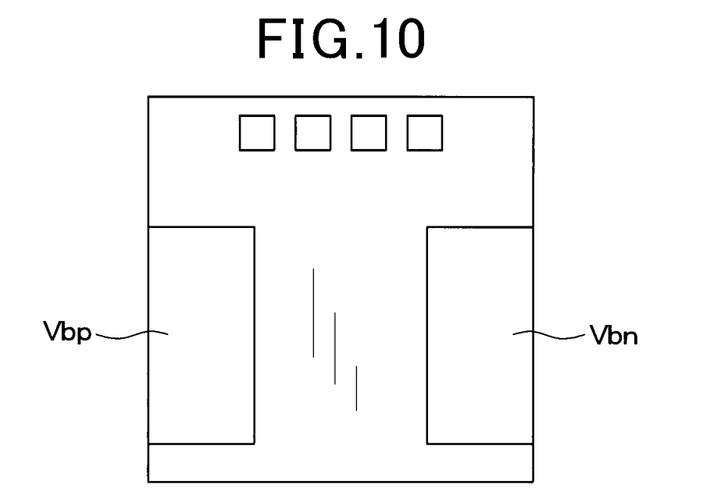
FIG. 10 is a diagram illustrating an example of a back surface structure of a G module.

However, such a printed-boardless structure, in which a G module is directly bonded to a set of identically shaped terminals, disables change of wiring patterns unlike in the structure using a printed board. For example, as shown in FIG. 10, such a G module has a back surface provided with a first land Vbp and a second land Vbn which are arranged along respective two facing sides of the G module. Although not shown, for example, the first and second lands Vbp and Vbn are ensured to be respectively bonded to two identically shaped terminals that are juxtaposed in the y-axis direction.

Specifically, for a G module that detects acceleration in the x-axis direction, the first and second lands Vbp and Vbn are juxtaposed along the y-axis direction different from the x-direction in which the acceleration is detected, and are connected to respective identically shaped terminals. For a G module that detects acceleration in the y-axis direction, the first and second lands Vbp and Vbn are juxtaposed along the y-axis direction in which the acceleration is detected, and are connected to respective identically shaped terminals. For a G module that detects acceleration in the z-axis direction, the first and second lands Vbp and Vbn are juxtaposed along the y-axis direction different from the z-direction in which the acceleration is detected, and are connected to respective identically shaped terminals.

Thus, when a set of identically shaped terminals are used, different G modules are required to be individually prepared for acceleration detection in the x-, y- and z-axis directions, which raises a problem of not well reducing the number of types of G modules to be produced.

The sensor device disclosed in the patent document JP 2007-40950 A is designed such that the four corners of each identically shaped chip are provided with respective terminals. Specifically, in each chip, the first and second lands are arranged at respective opposing corners, and two reference terminals are arranged on the respective remaining opposing corners. The reference terminals receive and transmit signals as references for the signals transmitted through the first and second lands, while being connected to each other inside the acceleration sensor. Thus, when a printed board that enables change of wiring patterns is used in this structure, the first and second lands can be connected to a wiring pattern different from the wiring pattern to which the two reference terminals are connected. Accordingly, identically structured chips can be used for a plurality of sensor devices with rotation of 90°.

However, in the case of using a set of identically shaped terminals with a G module being directly bonded to these identically shaped terminals, a reference terminal and the first or second land are both connected to the same terminal. This causes the first or second land and the reference terminal to have the same potential. Therefore, identically configured G modules cannot be used for a plurality of sensor devices.

SUMMARY

The present disclosure has been made in light of the background set forth above and has an object of enabling use of identically shaped terminals and identically configured G modules formed with respective acceleration detection elements, for a plurality of types of collision detection sensors that detect acceleration in different directions.

To achieve the above object, a collision detection sensor of the present disclosure includes an acceleration detection element having a front surface and a back surface to detect acceleration in a direction parallel to the front surface. The back surface is provided with a sensor module (10, 10x, 10y)

in which a first land and a second land are formed, and is also provided with a first terminal and a second terminal. The first terminal has a first bonding surface bonded to the first land and a first drawn portion drawn from the first bonding surface. The second terminal has a second bonding surface bonded to the second land and a second drawn portion drawn from the second bonding surface. The sensor module is in a cuboid shape and has a rectangular back surface having four corners. Of the four corners, one corner in a pair of opposing corners is provided with the first land and the other corner in the pair is provided with the second land.

With this configuration, by rotating the sensor module by an angle of 90°, another sensor module for use in a different direction can be provided. Accordingly, it is not necessary to separately prepare two types of sensor modules. In other words, a set of terminals used for detecting acceleration in a direction can be used for detecting acceleration in a different direction. Thus, identically shaped terminals can be used for a plurality of types of collision detection sensors for detecting acceleration in different directions. In addition, sensor modules, in which respective acceleration detection elements are formed, can be identically configured and used for the collision detection sensors.

DETAILED DESCRIPTION OF THE PREFERRED EMBODIMENTS

With reference to the accompanying drawings, several embodiments of the present disclosure will be described. In the embodiments described below, the components identical with or similar to each other are given the same reference numerals.

First Embodiment

With reference to FIGS. 1A to 4C, a first embodiment of the present disclosure will be described. The present embodiment will be described taking as an example the case where collision detection sensors are applied to a vehicle airbag system. Vehicle airbag systems detect acceleration in three directions, that is, the longitudinal, lateral and vertical directions of the vehicle to control the airbags. The following description is provided taking the case of front airbag sensors, in which x-axis direction refers to the longitudinal direction of the vehicle, y-axis direction refers to the lateral direction thereof, and z-axis direction refers to the vertical direction thereof.

Two standards are widespread as communication protocols for vehicle airbag systems. One is the peripheral sensor interface 5 (PSI5) communication protocol, and the other is the distributed system interface 3 (DSI3) communication protocol. The present embodiment will be described focusing on collision detection sensors using the PSI5 communication protocol.

Each front airbag sensor of a vehicle airbag system includes a chip formed with an acceleration detection element (hereinafter this chip is referred to as G module). In PSI5 communication, the G module needs to be provided with two terminals, that is, a first land Vbp and a second land Vbn to communicate with an electronic control unit for controlling the airbag system (hereinafter referred to as airbag ECU).

Figure 1A:
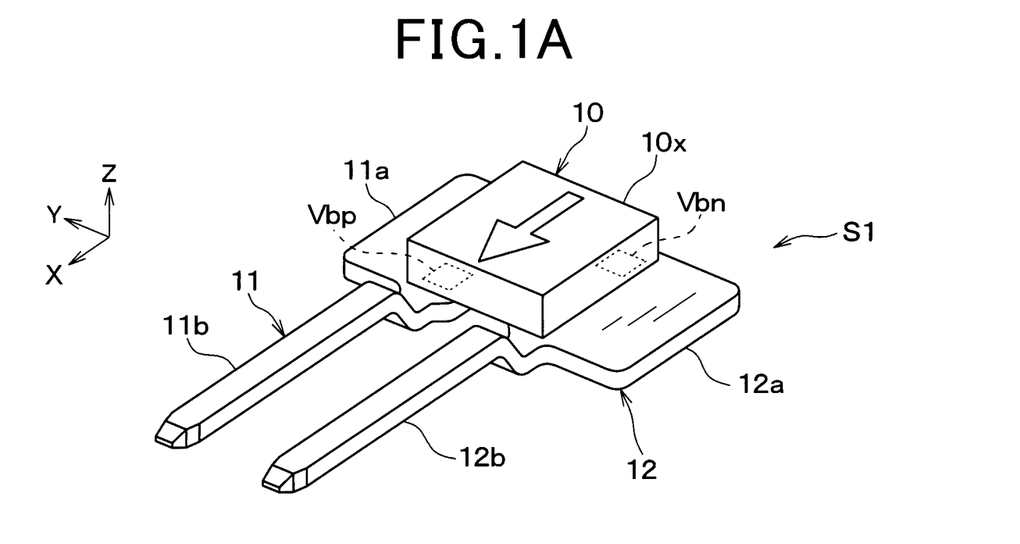
FIG. 1A is a perspective view illustrating a collision detection sensor for use in the x-axis direction, according to a first embodiment of the present disclosure.
Figure 1B:
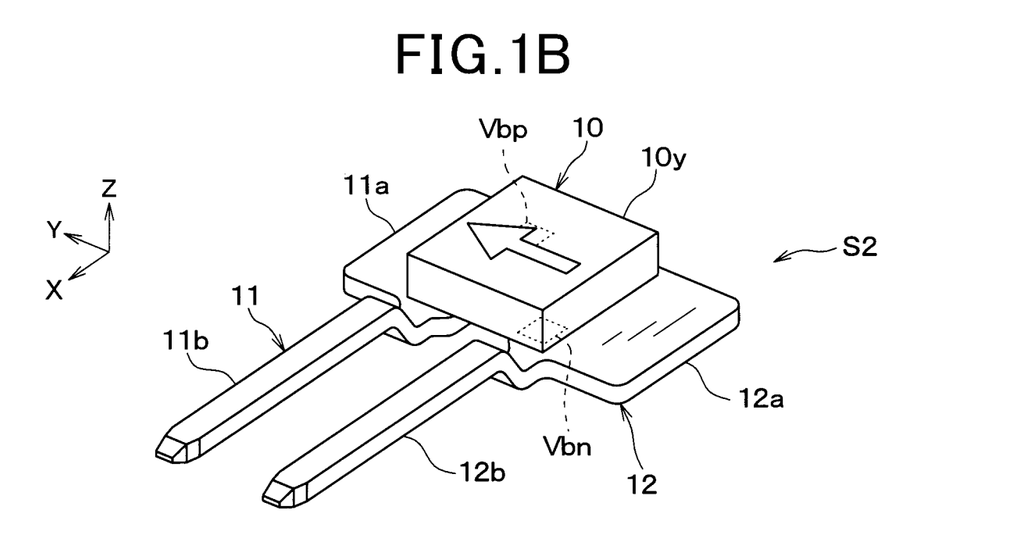
FIG. 1B is a perspective view illustrating a collision detection sensor for use in the y-axis direction, according to the first embodiment.
Figure 1C:
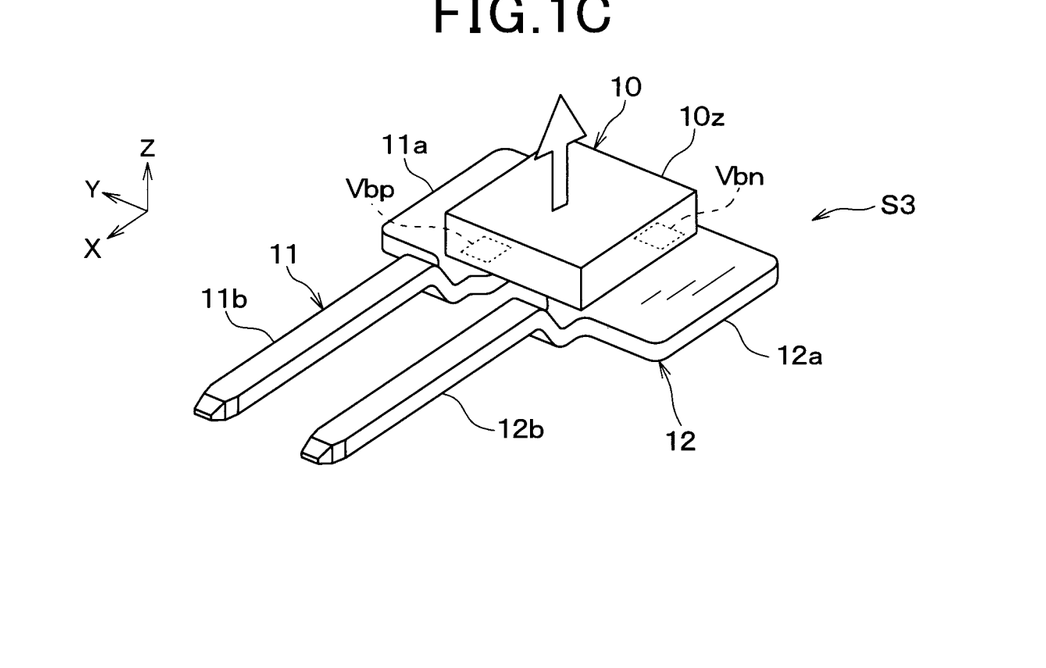
FIG. 1C is a perspective view illustrating a collision detection sensor for use in the z-axis direction, according to the first embodiment.
Figure 2:
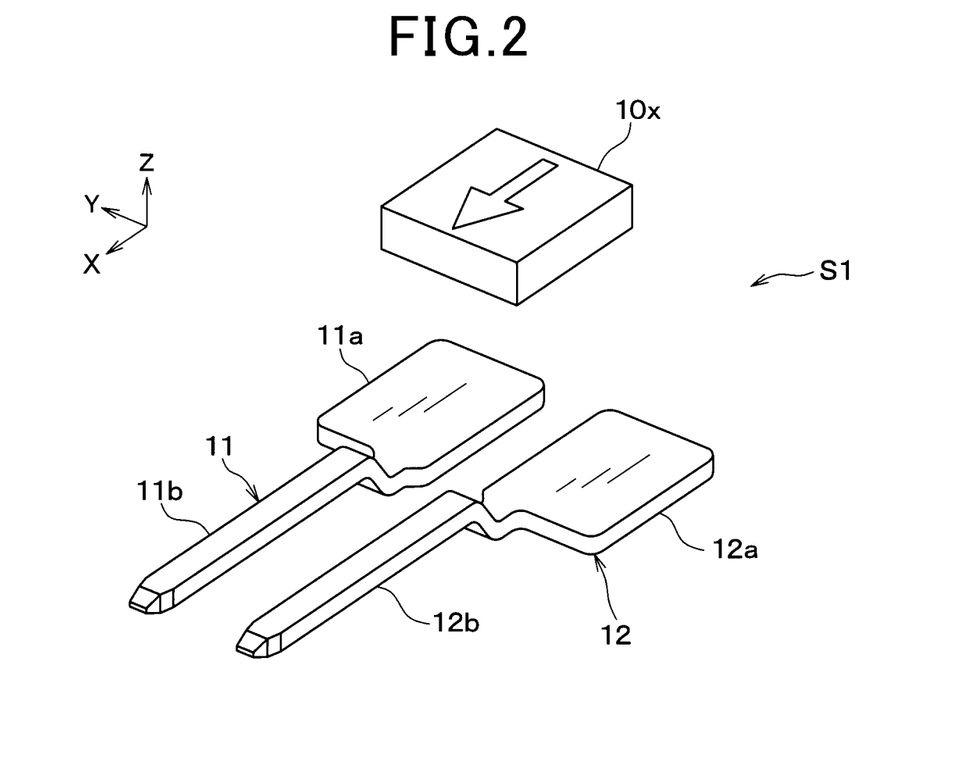
FIG. 2 is an exploded perspective view illustrating the collision detection sensor illustrated in FIG. 1A.

FIGS. 1A to 1C are schematic perspective views respectively illustrating collision detection sensors S1, S2 and S3, as examples, for detecting acceleration in the x-, y- and z-axis directions. The arrows shown in FIGS. 1A to 1C each indicate a direction in which acceleration is detected. FIG. 2 is an exploded perspective view illustrating the collision detection sensor S1. The same structure is applied to the collision detection sensors S2 and S3.

As shown in FIG. 1A, the collision detection sensor S1 is provided with a G module 10 in which an acceleration detection element is formed. The G module 10 is mounted to a set of identically shaped terminals (hereinafter just referred to as identically shaped terminals) 11 and 12 to detect acceleration in the x-axis direction. The collision detection sensors S2 and S3 shown in FIGS. 1B and 1C are configured similarly to the collision detection sensor S1 to detect acceleration in the y- and x-axis directions, respectively.

Figure 4A:
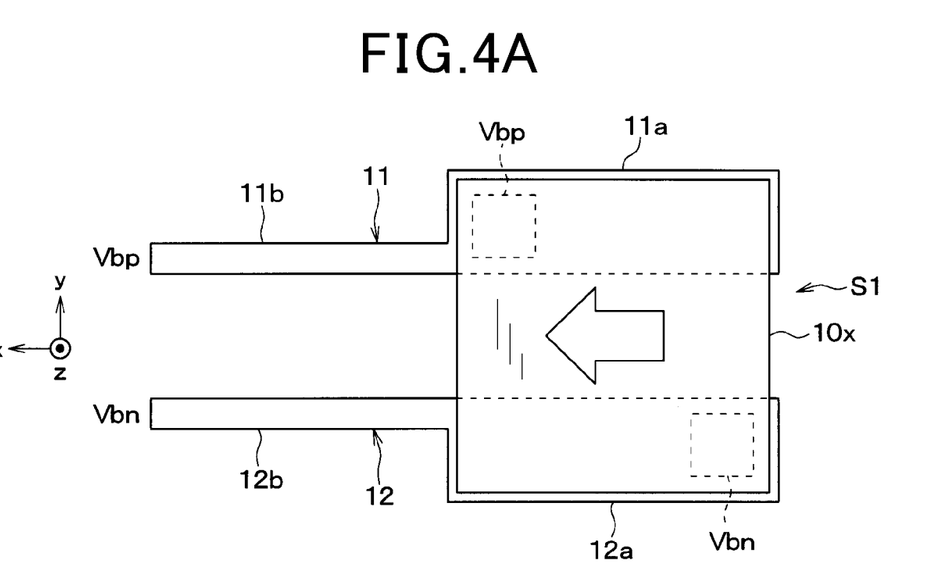
FIG. 4A is a top view illustrating the collision detection sensor for use in the x-axis direction, according to the first embodiment.

The collision detection sensor S1 shown in FIGS. 1A and 4A detects acceleration in the x-axis direction. The collision detection sensor S1 is provided with a G module 10x having a rectangular (square in the present example) upper surface. The G module 10x incorporates a chip in which an acceleration detection element is formed. In the present example, the chip is provided with a peripheral circuit, such as a circuit for processing signals, in addition to the acceleration detection element, so that the G module 10x serves as SiP (system in package).

The acceleration detection element provided to the G module 10x, which is applied to the collision detection sensor S1, is configured to detect acceleration in one direction, as indicated by the arrow in the figures, parallel to a surface of the G module 10x. For example, the G module 10x is provided with a comb-tooth-shaped capacitive acceleration detection element. Although not shown, with an application of acceleration, the acceleration detection sensor detects the applied acceleration, based on a change in capacitance due to the change in distance between a fixed electrode as a comb tooth and a movable electrode.

Specifically, the G module 10x with a square upper surface has a first pair of parallel sides facing each other, and a second pair of parallel sides facing each other and perpendicular to the first pair of sides. The acceleration detection element formed in the G module 10x is configured to detect acceleration in a direction parallel to the first pair of sides. In the present embodiment, the G module 10x is disposed such that the detection direction of the acceleration detection element formed therein aligns with the x-axis direction, and is connected to the terminals 11 and 12.

Figure 3:
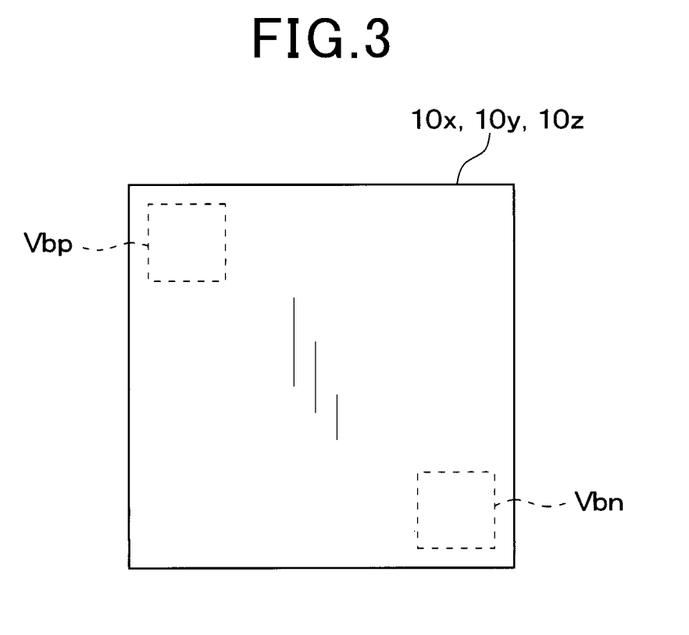
FIG. 3 is a top view illustrating a layout in a G module.

In PSI5 communication mentioned above, the G module 10x is provided with two cuboid terminals, that is, a first land Vbp and a second land Vbn. As shown in FIGS. 1A and 3, the G module 10x has a surface that is a front surface which is on a side opposite of the terminals 11 and 12, and a surface that is a back surface which is on the terminals 11 and 12 side and is provided with the first land Vbp and the second land Vbn. As shown in FIG. 3, the G module 10x with a square upper surface has four corners in which one corner in a pair of opposing corners is provided with the first land Vbp and the other corer in the pair is provided with the second land Vbn. In the present embodiment, the G module 10x is structured, with the remaining pair of opposing corners being provided with no terminals.

The terminal 11 corresponds to the third terminal and includes, as shown in FIG. 2, a flat bonding surface 11a that is bonded to the first land Vbp and a drawn portion 11b that is unidirectionally drawn from the bonding surface 11a. Similarly, the terminal 12 corresponds to the second terminal and includes a flat bonding surface 12a that is bonded to the second land Vbn and a drawn portion 12b that is unidirectionally drawn from the bonding surface 12a. The bonding surfaces 11a and 12a of the terminals 11 and 12 are each in a rectangular shape whose long sides have a length that is not less than the length of a side of the G modules 10x, 10y and 10z. The terminals 11 and 12 are juxtaposed with a predetermined interval therebetween, and with the drawn portions 11b and 12b being drawn to the same direction. With the terminals 11 and 12 being in this state, the G module 10x is placed on the bonding surfaces 11a and 12b, and the first and second lands Vbp and Vbn are respectively bonded to the terminals 11 and 12 by soldering or the like.

As shown in FIG. 4A, the collision detection sensor S1 is disposed so that the arrow in the figure aligns with the x-axis direction. In other words, the G module 10x is bonded to the terminals 11 and 12 such that the direction of detecting acceleration is perpendicular to the direction of disposing the bonding surfaces 11a and 12a (y-axis direction). In the present embodiment, since the direction of drawing the drawn portions 11b and 12b is perpendicular to the direction of disposing the bonding surfaces 11a and 12a, the direction of detecting acceleration aligns with the direction of drawing the drawn portions 11b and 12b. In the G module 10x having four corners, $d_1$ indicates a distance from the corner provided with the first land Vbp to the base of the drawn portion 11b. Also, $d_2$ indicates a distance from the corner provided with the second land Vbn to the base of the drawn portion 12b. The corner provided with the first land Vbp and the corner provided with the second land Vbn are bonded to the bonding surfaces 11a and 12a, respectively, so that the distance $d_2$ is larger than $d_1$. This is how the collision detection sensor S1 is configured.

Figure 4B:
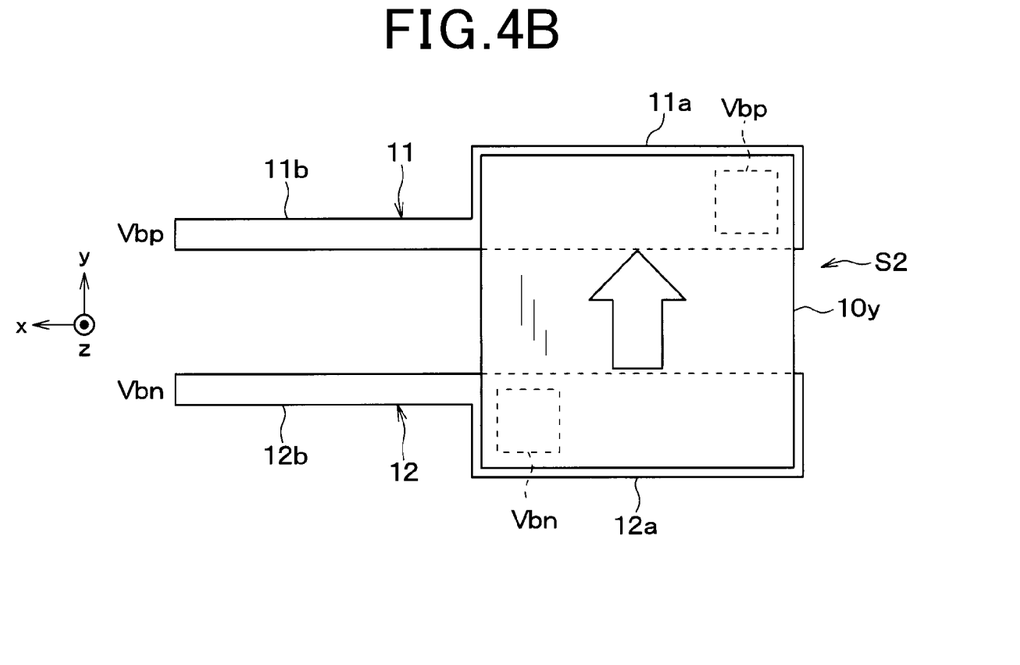
FIG. 4B is a top view illustrating the collision detection sensor for use in the y-axis direction, according to the first embodiment.

The collision detection sensor S2 shown in FIGS. 1B and 4B detects acceleration in the y-axis direction. The collision detection sensor S2 is configured by a G module 10y and terminals 11 and 12. The G module 10y is configured similarly to the G module 10x for detecting acceleration in the x-axis direction, and, as shown in FIG. 3, has a back surface that is formed with a first land Vbp and a second land Vbn. The terminals 11 and 12 are identically shaped with the ones used for the collision detection sensor S1. However, the G module 10y is bonded to the terminals 11 and 12 at an angle different from the G module 10x to detect acceleration in the y-axis direction.

Specifically, as shown in FIG. 4B, the G module 10y is disposed such that the arrow indicated in the figure aligns with the y-axis direction. More specifically, the G module 10y is bonded to the terminals 11 and 12 such that the direction of detecting acceleration is parallel to the direction of disposing the bonding surfaces 11a and 12a, with a displacement relative to the G module 10x by an angle of 90°. In the present embodiment, since the direction of drawing the drawn portions 11b and 12b is perpendicular to the direction of disposing the bonding surfaces 11a and 12a, the angle of the G module 10y is adjusted so that the direction of detecting acceleration is perpendicular to the direction of drawing the drawn portions 11b and 12b.

In the G module 10y having four corners, $d_3$ indicates a distance from the corner provided with the first land Vbp to the base of the drawn portion 11b. Also, $d_4$ indicates a distance from the corner provided with the second land Vbn to the base of the drawn portion 12b. The corner provided with the first land Vbp and the corner provided with the second land Vbn are bonded to the bonding surfaces 11a and 12a, respectively, so that the distance $d_3$ is larger than $d_4$. This is how the collision detection sensor S2 is configured.

The collision detection sensor S3 shown in FIG. 1C detects acceleration in the z-axis direction. The collision detection sensor S3 is configured by a G module 10z and terminals 11 and 12. As shown in FIG. 3, the G module 10z has a back surface that is formed with a first land Vbp and a second land Vbn. The G module 10z is configured differently from the G modules 10x and 10y and has a structure for detecting acceleration in the z-axis direction.

The G module 10z is similar to the G modules 10x and 10y in that the overall shape is square and that the surface on a side opposite of the terminals 11 and 12 serves as a front surface and the surface on the terminals 11 and 12 side serves as a back surface, with the provision of the first and second lands Vbp and Vbn. However, the acceleration detection sensor of the G module 10z has a structure that is modified so as to enable detection of acceleration in a direction normal to the front and back surfaces of the G module 10z and to cause a change in capacitance when acceleration in the z-axis direction is applied thereto.

Figure 4C:
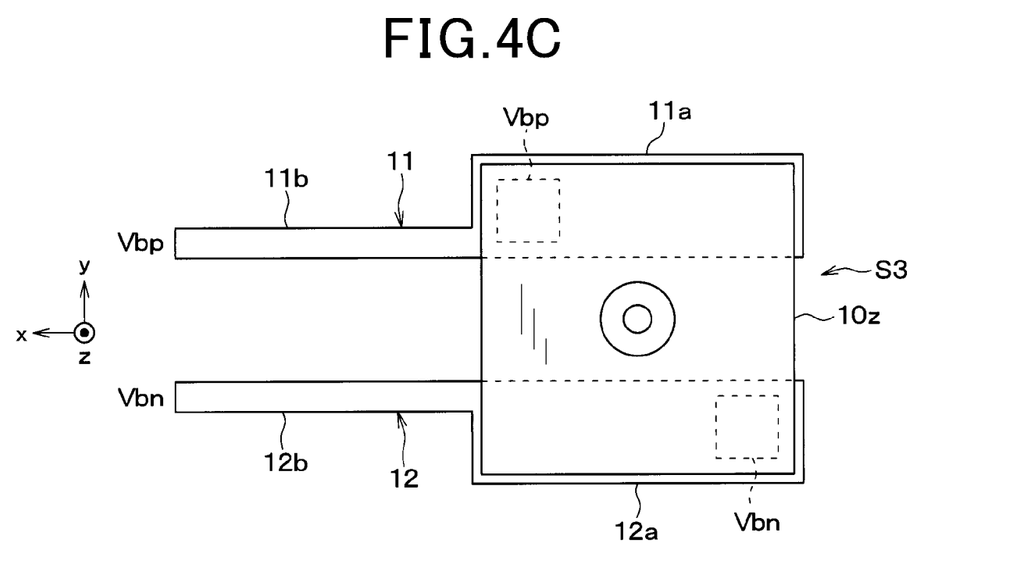
FIG. 4C is a top view illustrating the collision detection sensor for use in the z-axis direction, according to the first embodiment.

In the collision detection sensor S3 of the present embodiment as well, the first and second lands Vbp and Vbn provided to the G module 10z are disposed similarly to the G modules 10x and 10y. As shown in FIG. 4C, in the G module 10z having four corners, $d_5$ indicates a distance from the corner provided with the first land Vbp to the base of the drawn portion 11b. Also, $d_6$ indicates a distance from the corner provided with the second land Vbn to the base of the drawn portion 12b. The corner provided with the first land Vbp and the corner provided with the second land Vbn are bonded to the bonding surfaces 11a and 12a, respectively, so that the distance $d_5$ is larger than $d_6$. This is how the collision detection sensor S3 is configured.

The first and second lands Vbp and Vbn provided to the G module 10z are disposed similarly to the G modules 10x and 10y. However, in the G module 10z that needs to be different from the G modules 10x and 10y in the structure, the first and second lands Vbp and Vbn do not have to be necessarily disposed similarly to the G modules 10x and 10y. For example, as shown in FIG. 10, the G module 10z may have a structure in which the first and second lands Vbp and Vbn are disposed on the back surface so as to be located along two facing sides. In this disposition as well, the first and second lands Vbp and Vbn can be bonded to the respective terminals 11 and 12.

The collision detection sensors S1, S2 and S3 for detecting acceleration in the x-, y- and z-axis directions of the present embodiment are configured as described.

The collision detection sensors S1, S2 and S3 configured in this way use identically shaped terminals 11 and 12. Further, the G module 10x used for the collision detection sensor S1 can have a configuration identical with the G module 10y used for the collision detection sensor S2.

Specifically, in each of the G modules 10x and 10y, the first and second lands Vbp and Vbn are disposed at the respective opposing corners. As can be seen from FIGS. 4A and 4B, 90° rotation of the G module 10x can provide the G module 10y.

Thus, the G modules 10x and 10y for the collision detection sensors S1 and S2 can be identically configured as one type of G module to respectively detect acceleration in the x- and y-axis direction, and accordingly it is not necessary to prepare two types of G modules for these directions. The G module 10z for the collision detection sensor S3 for detecting acceleration in the z-axis direction is separately prepared as another type of G module. Thus, acceleration detection in three directions, that is, the x-, y- and z-axis directions can be achieved by using two types of G modules and a set of identically shaped terminals 11 and 12.

Thus, use of identically shaped terminals 11 and 12 and identically configured G modules 10x and 10y having respective acceleration detection elements enables production of a plurality of types of collision detection sensors S1, S2 and S3 for detecting acceleration in different directions.

Second Embodiment

The following description addresses a second embodiment of the present disclosure. The present embodiment is different from the first embodiment in that there is a change in the back surface structures of the G modules 10x, 10y and 10z. The rest of the configuration is the same as the first embodiment and therefore the following description is focused on the difference from the first embodiment.

Figure 5:
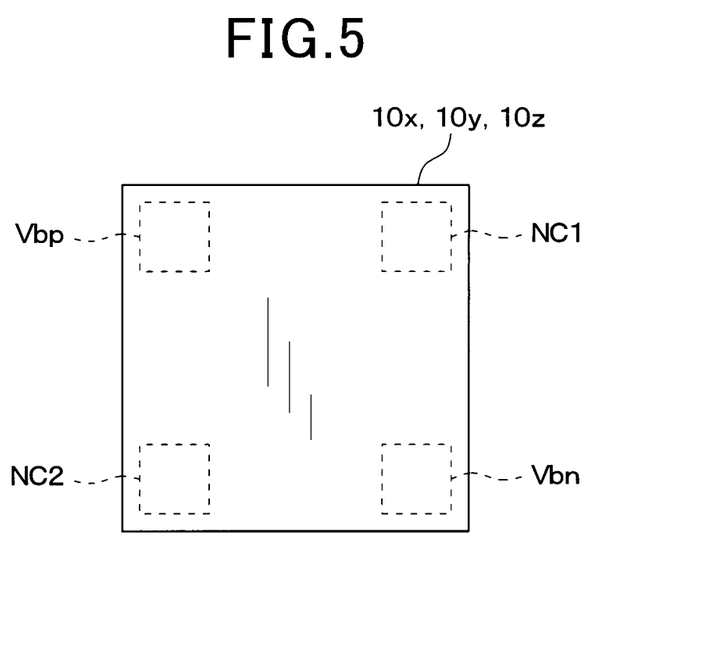
FIG. 5 is a top view illustrating a G module provided to a collision detection sensor, according to a second embodiment of the present disclosure.

FIG. 5 is a top view illustrating a G module provided to a collision detection sensor, according to the second embodiment. As shown in FIG. 5, The G module 10x, 10y or 10z of the present embodiment has a back surface in which a first land Vbp and a second land Vbn, both having a cuboid shape, are disposed at opposing corners, and a first non-connectable terminals NC1 and a second non-connectable terminal NC2, both having a cuboid shape, are disposed at the remaining opposing corners. The first and second non-connectable terminals NC1 and NC2 serve as dummy terminals that are not connected to acceleration detection elements or signal processing circuits. The four terminals, that is, the first and second lands Vbp and Vbn and the first and second non-connectable terminals NC1 and NC2 are disposed at four respective corners of the G module.

As mentioned above, the first and second lands Vbp and Vbn are bonded to the terminals 11 and 12, respectively, by soldering or other methods. If the G module 10x, 10y or 10z is provided with only the first and second lands Vbp and Vbn, the G module is bonded to the terminals 11 and 12 being supported at two points. This two-point support may lead to unstable mounting causing, for example, tilting of the G module 10x, 10y or 10z when bonded.

Figure 6A:
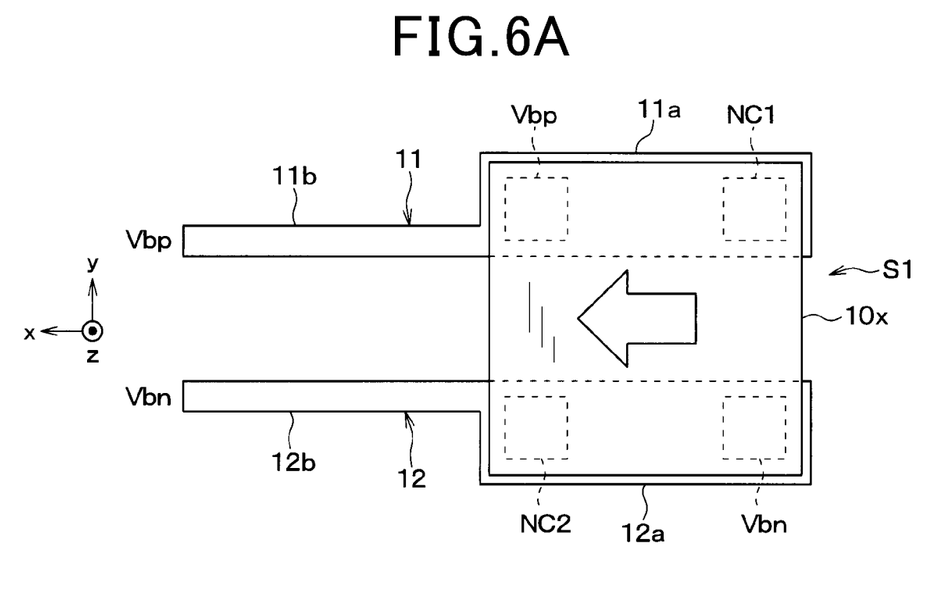
FIG. 6A is a top view illustrating a collision detection sensor for use in the x-axis direction, according to the second embodiment.
Figure 6B:
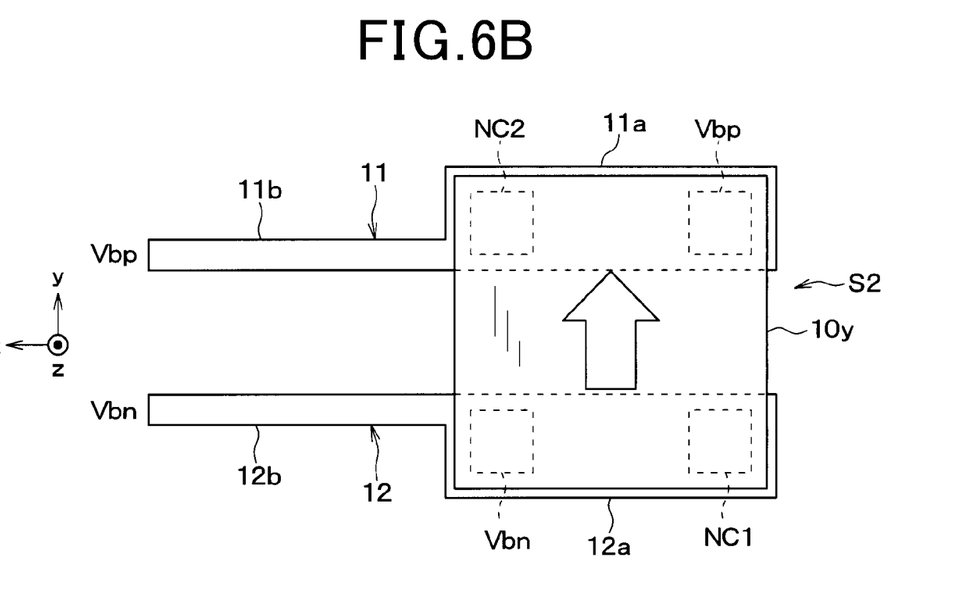
FIG. 6B is a top view illustrating a collision detection sensor for use in the y-axis direction, according to the second embodiment.
Figure 6C:
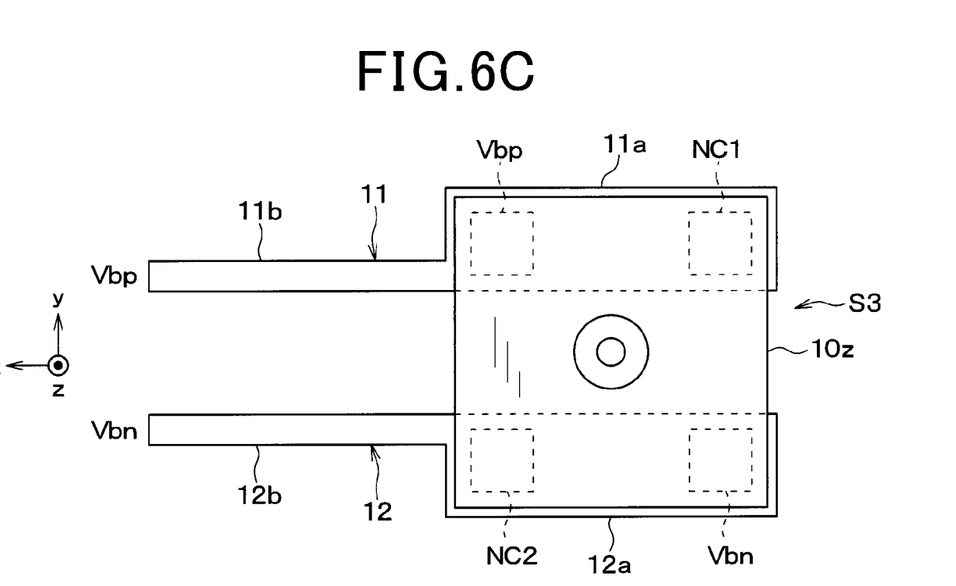
FIG. 6C is a top view illustrating a collision detection sensor for use in the z-axis direction, according to the second embodiment.

As measures against this, the G module 10x, 10y or 10z of the present embodiment is provided with the first and second non-connectable terminals NC1 and NC2 at opposing corners which are different from the opposing corners where the first and second lands Vbp and Vbn are disposed, respectively. Thus, as shown in FIGS. 6A to 6C, the G module 10x, 10y or 10z can be bonded to the terminals 11 and 12 through four-point support. In this way, the G module 10x, 10y or 10z is prevented from being tilted when bonded to the terminals, thereby ensuring stable bonding.

As mentioned above, the first and second non-connectable terminals NC1 and NC2 are dummy terminals that are not electrically connected to the acceleration detection element or the signal processing circuit. Therefore, no problem is raised if they are bonded to the terminals 11 and 12 by soldering or other methods.

Specifically, as shown in FIG. 6A, the G module 10x is bonded to the terminal 11 via the first land Vbp and the first non-connectable terminal NC1, and to the terminal 12 via the second land Vbn and the second non-connectable terminal NC2. As shown in FIG. 6B, the G module 10y is bonded to the terminal 11 via the first land Vbp and the second non-connectable terminal NC2, and to the terminal 12 via the second land Vbn and the first land NC1.

Thus, in the G module 10x, it is the first non-connectable terminal NC1 which is bonded to the terminal 11, whereas, in the G module 10y, it is the second non-connectable terminal NC2 which is connected to the terminal 11. In other words, the non-connectable terminal bonded to the terminal 11 is different between the G module 10x and the G module 10y. Similarly, in the G module 10x, it is the second non-connectable terminal NC2 which is bonded to the terminal 12, whereas, in the G module 10y, it is the first non-connectable terminal NC1 which is connected to the terminal 12. In other words, the non-connectable terminal bonded to the terminal 12 is different between the G module 10x and the G module 10y.

However, since the first and second non-connectable terminals NC1 and NC2 are dummy terminals, these terminals, when connected to the terminal 11 or 12, do not affect the potential of the first land Vbp or the second land Vbn connected to the same terminal 11 or 12.

Thus, with the configuration of the present embodiment, advantageous effects similar to those of the first embodiment can be achieved, and at the same time, stability of bonding can be enhanced.

As shown in FIG. 6C, the G module 10z is also bonded to the terminal 11 via the first land Vbp and the first non-connectable terminal NC1, and to the terminal 12 via the second land Vbn and the second non-connectable terminal NC2. However, the potential of the first land Vbp or the second land Vbn is not adversely affected.

Third Embodiment

The following description addresses a third embodiment of the present disclosure. The present embodiment is different from the first or second embodiment in that distributed system interface 3 (DSI3), as a communication protocol, is applied to the collision detection sensors. The rest of the configuration is similar to the first or second embodiment, and thus the following description is focused on the difference. Similar to the second embodiment, each sensor of the present embodiment is provided with a first non-connectable terminal NC1 and a second non-connectable terminal NC2; however these non-connectable terminals may be omitted as in the first embodiment.

Figure 7:
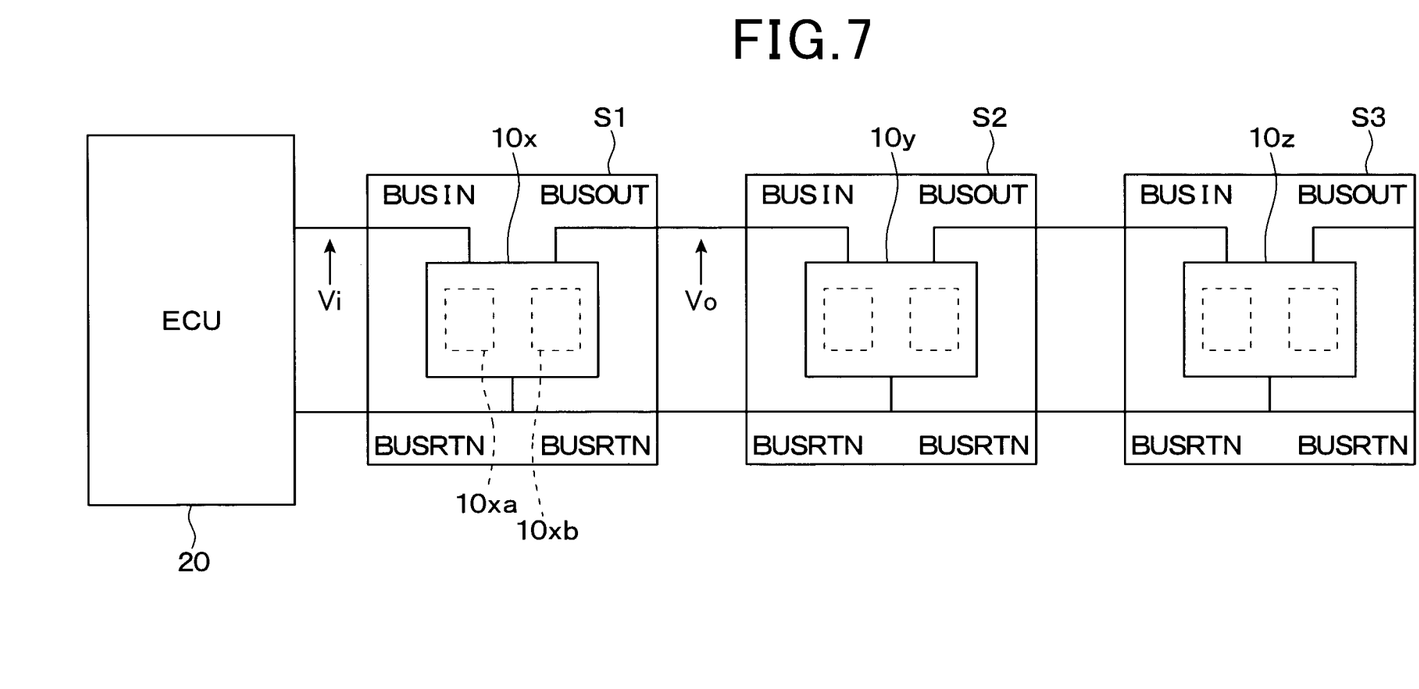
FIG. 7 is a block diagram illustrating a communication mode of a collision detection sensor used in an airbag system, according to a third embodiment of the present disclosure.

FIG. 7 is a block diagram illustrating a communication mode of collision detection sensors based on DSI3, and used in an airbag system according to the third embodiment of the present disclosure. As shown in FIG. 7, in the DSI3 communication, a plurality of collision detection sensors S1, S2 and S3 are daisy-chain connected to a single airbag ECU 20 to enable signal reception and transmission between the collision detection sensors S1, S2 and S3. To receive and transmit signals, the DSI3 communication employs a configuration provided with a bus-in terminal BUSIN and a bus-out terminal BUSOUT, and a bus-return terminal BUSRTN. The bus-in terminal BUSIN is connected to a high voltage bus through which a voltage is supplied. The bus-out terminal BUSOUT outputs the voltage to the subsequent sensor through the high voltage bus and the bus-return terminal BUSRTN is connected to a reference voltage bus through which a current is returned to the airbag ECU 20.

The collision detection sensor S1 includes a G module 10x which is provided with an acceleration detection element 10xa, a peripheral circuit 10xb, and the like. In the collision detection sensor S1, the bus-in terminal BUSIN, the bus-out terminal BUSOUT and the bus-return terminal BUSRTN are arbitrarily connected to the wiring of the peripheral circuit 10xb. Since the collision detection sensors S2 and S3 are configured similarly to the collision detection sensor S1, description is omitted.

For example, when collision detection is performed, a voltage Vi (voltage pulse signal) is inputted from the airbag ECU 20 to the bus-in terminal BUSIN of the collision detection sensor S1 which is located nearest to the airbag ECU 20. Based on the input, a voltage Vo (voltage pulse signal) is transmitted to the bus-in terminal BUSIN of the collision detection sensor S2 at the subsequent stage, through the bus-out terminal BUSOUT of the collision detection sensor S1. Similarly, a pulse signal is transmitted to the bus-in terminal BUSIN of the collision detection sensor S3 at the subsequent stage, through the bus-out terminal BUSOUT of the collision detection sensor S2.

The collision detection sensors S1, S2 and S3 output respective response signals in the form of current at different time points, through the bus-in terminals BUSIN and the bus-return terminals BUSRTN. The response signals, each of which indicates a detected acceleration, are transmitted to the airbag ECU 20, so that the airbag ECU 20 can determine whether an acceleration requiring inflation of the airbags has been caused.

To be suitable for the application of such a communication mode, DSI3 communication employs the configuration including the three terminals of the bus-in terminal BUSIN, the bus-out terminal BUSOUT and the bus-return terminal BUSRTN.

Figure 8:
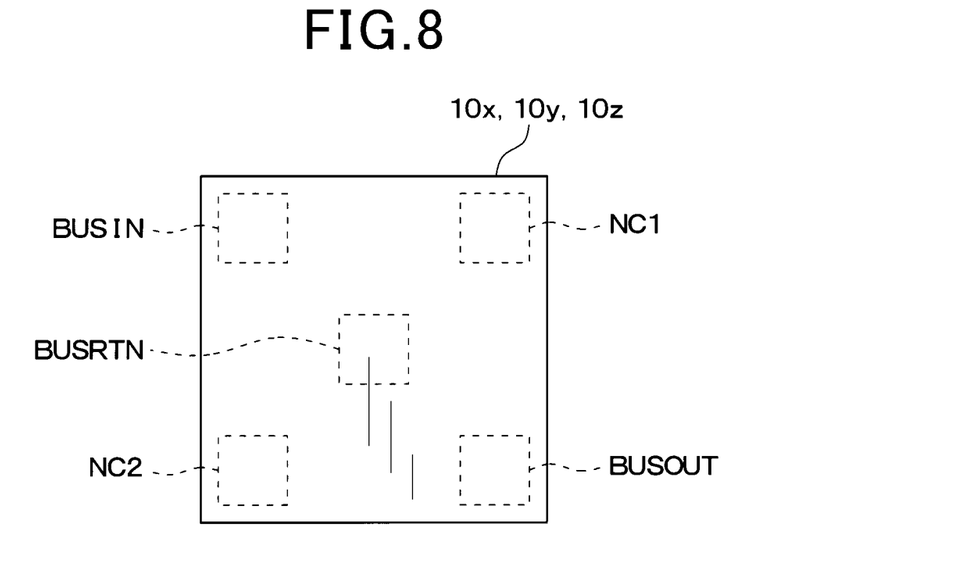
FIG. 8 is a top view illustrating a layout in a G module.

Thus, as shown in FIG. 8, the G modules 10x, 10y and 10z in a square shape of the present embodiment each have a back surface in which a bus-in terminal BUSIN in a cuboid shape is located at one corner in a pair of opposing corners, and a bus-out terminal BUSOUT in a cuboid shape is located at the other corner in the pair, among the four corners. Further, in the back surface of each of the G modules 10x, 10y and 10z, a first non-connectable terminal NC1 is located at one corner in the remaining pair of opposing corners, and a second non-connectable terminal NC2 is located at the other corner in the remaining pair, among the four corners. The first and second non-connectable terminals NC1 and NC2 serve similarly to the ones described in the second embodiment, and thus enhance bonding stability. In addition to these terminals, the G modules 10x, 10y and 10z are each provided with a bus-return terminal BUSRTN in a cuboid shape at the center.

Figure 9A:
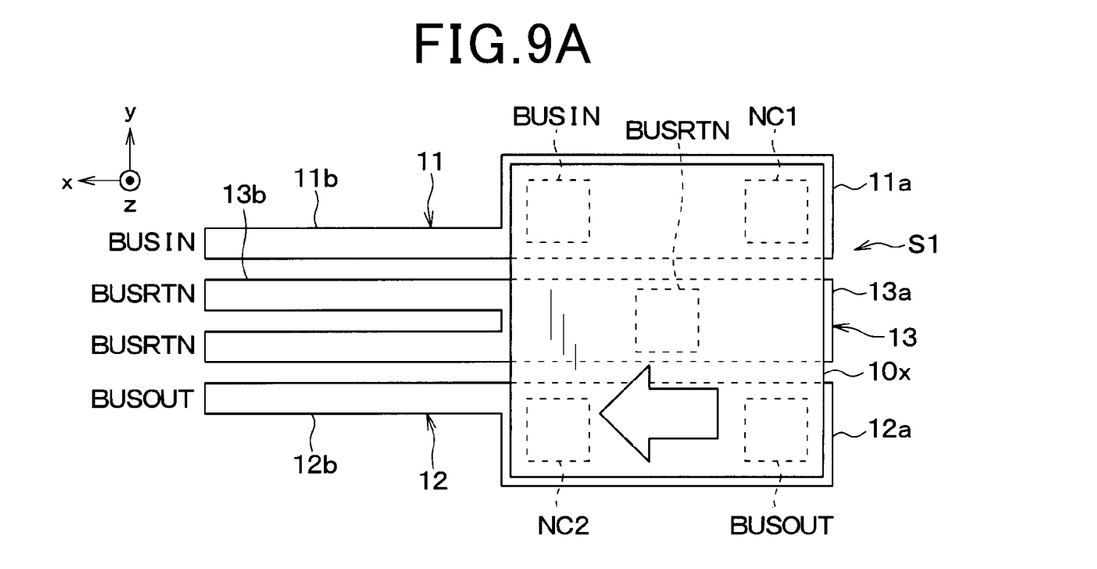
FIG. 9A is a top view illustrating a collision detection sensor for use in the x-axis direction, according to a fourth embodiment of the present disclosure.
Figure 9B:
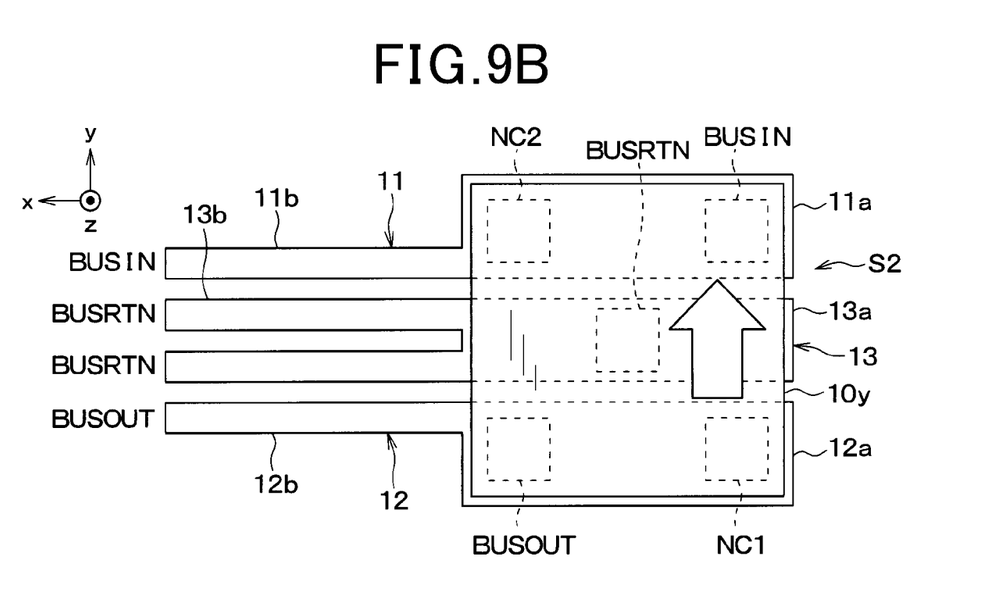
FIG. 9B is a top view illustrating a collision detection sensor for use in the y-axis direction, according to the fourth embodiment.
Figure 9C:
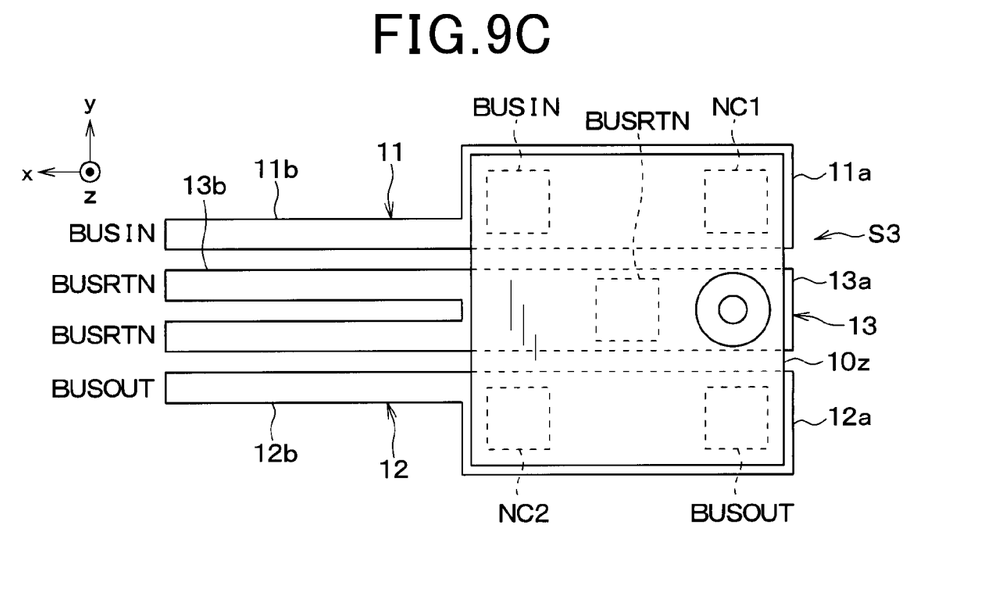
FIG. 9C is a top view illustrating a collision detection sensor for use in the z-axis direction, according to the fourth embodiment.

FIGS. 9A to 9C respectively show the collision detection sensors S1, S2 and S3 of the present embodiment. In addition to the terminals 11 and 12, these sensors each include the terminal 13 connected to the bus-return terminal BUSRTN. The terminal 13 corresponds to the third terminal and includes a flat rectangular bonding surface 13a and a drawn portion 13b drawn from an end of the bonding surface 13a. The drawn portion 13b is structured by two parallelly drawn segment portions. The terminal 13 configured in this way is disposed between the terminals 11 and 12 and connected to the bus-return terminal BUSRTN.

Specifically, as shown in FIG. 9A, the collision detection sensor S1 is disposed such that the direction of the arrow in the figure aligns with the x-axis direction. More specifically, the G modules 10x is bonded to the terminals 11, 12 and 13 such that the acceleration detection direction is perpendicular to the direction of disposing the bonding surfaces 11a, 12a and 13a (y-axis direction). In the present embodiment, since the direction of drawing the drawn portions 11b, 12b and 13b is perpendicular to the direction of disposing the bonding surfaces 11a, 12a and 13a, the acceleration detection direction is aligned with the drawn direction. In the G module 10x having four corners, $d_7$ indicates a distance from the corner provided with the bus-in terminal BUSIN to the base of the drawn portion 11b. Also, $d_8$ indicates a distance from the corner provided with the first non-connectable terminal NC1 to the base of the drawn portion 11b.

The corner provided with the bus-in terminal BUSIN and the corner provided with the first non-connectable terminals NC1 are bonded to the bonding surface 11a such that $d_8$ is larger than $d_7$. In the G module 10x, $d_9$ indicates a distance from the corner provided with the bus-out terminal BUSOUT to the base of the drawn portion 12b. Also, $d_{10}$ indicates a distance from the corner provided with the second non-connectable terminal NC2 to the base of the drawn portion 12b. The corner provided with the bus-out terminal BUSOUT and the corner provided with the second non-connectable terminal NC2 are bonded to the bonding surface 12a such that $d_9$ is larger than $d_{10}$. Further, the terminal 13 is disposed between the terminals 11 and 12, with the drawn portion 13b being drawn in the same direction as the drawn portions 11b and 12b, so that the bus-return terminal is bonded to the bonding surface 13a.

As shown in FIG. 9B, the collision detection sensor S2 is bonded to the terminals 11, 12 and 13 of a G module 10y such that the arrow in the figure aligns with the y-axis direction, that is, such that the acceleration detection direction is parallel to the direction of disposing the bonding surfaces 11a, 12a and 13a. In other words, the G module 10y is disposed so as to be displaced from the G module 10x by an angle 90°. In the present embodiment, since the direction of drawing the drawn portions 11b, 12b, and 13b is perpendicular to the direction of disposing the bonding surfaces 11a, 12a and 13a, the acceleration detection direction is adjusted so as to be perpendicular to the drawn direction.

In the G module 10y having four corners, $d_{11}$ indicates a distance from the corner provided with the bus-in terminal BUSIN to the base of the drawn portion 11b. Also, $d_{12}$ indicates a distance from the corner provided with the second non-connectable terminal NC2 to the base of the drawn portion 11b. The corner provided with the bus-in terminal BUSIN and the corner provided with the second non-connectable terminal NC2 are bonded to the bonding surface 11a such that $d_{11}$ is larger than $d_{12}$.

In the G module 10y, $d_{13}$ indicates a distance from the corner provided with a bus-out terminal BUSOUT to the base of the drawn portion 12b. Also, $d_{14}$ indicates a distance from the corner provided with the first non-connectable terminal NC1 to the base of the drawn portion 12b. The corner provided with the bus-out terminal BUSOUT and the corner provided with the first non-connectable terminal NC1 are bonded to the bonding surface 12a such that $d_{14}$ is larger than $d_{13}$. Further, the terminal 13 is disposed between the terminals 11 and 12, with the drawn portion 13b being drawn in the same direction as the drawn portions 11b and 12b, so that the bus-return terminal BUSRTN is bonded to the bonding surface 13a.

The collision detection sensor S3 shown in FIG. 9C includes a G module 10z. The G module 10z also includes a bus-in terminal BUSIN, a bus-out terminal BUSOUT, a bus-return terminal BUSRTN, a first non-connectable terminal NC1 and a second non-connectable terminal NC2. These terminals are disposed in the same way as in the G module 10x or 10y.

In the G module 10z having four corners, $d_{15}$ indicates a distance from the corner provided with the bus-in terminal BUSIN to the base of the drawn portion 11b. Also, $d_{16}$ indicates a distance from the corner provided with the first non-connectable terminal NC1 to the base of the drawn portion 12b. The corner provided with the bus-in terminal BUSIN and the corner provided with the first non-connectable terminal NC1 are bonded to the bonding surface 11a such that $d_{16}$ is larger than $d_{15}$.

In the G module 10z, $d_{17}$ indicates a distance from the corner provided with the bus-out terminal BUSOUT to the base of the drawn portion 12b. Also, $d_{18}$ indicates a distance from the corner provided with the second non-connectable terminal NC2 to the base of the drawn portion 12b. The corner provided with the bus-out terminal BUSOUT and the corner provided with the second non-connectable terminal NC2 are bonded to the bonding surface 12a such that $d_{17}$ is larger than $d_{18}$. Further, the terminal 13 is disposed between the terminals 11 and 12, with the drawn portion 13b being drawn in the same direction as the drawn portions 11b and 12b, so that the bus-return terminal BUSRTN is bonded to the bonding surface 13a.

The collision detection sensors S1, S2 and S3 of the present embodiment for respectively detecting acceleration in x-, y- and z-axis directions are configured as described above.

As described above, identically shaped terminals 11 and 12 can also be used for the collision detection sensors S1, S2 and S3 applied to DSI3 communication, and the G module 10x used for the collision detection sensor S1 can be identically configured with the G module 10y used for the collision detection sensor S2.

Other Embodiments

The technique of the present disclosure can be modified appropriately within a range of not departing from the present disclosure.

For example, the G modules 10x, 10y and 10z each do not necessarily need to have a square upper surface, but may have a different quadrangular shape, such as a rectangular shape, or may have a rounded or chamfered rectangular shape. Also, the shapes of the terminals 11, 12 and 13 are only examples. The terminal 11, 12 or 13 may be in a different shape, such as a shape in which the drawn portion 11b, 12b or 13b is drawn being partially curved, instead of being drawn straight.

In the embodiments described above, the collision detection sensors S1, S2 and S3 are configured by the respective G modules 10x, 10y and 10z and the terminals 11, 12 and 13. However, the collision detection sensors S1, S2 and S3 may be configured using other components. For example, the G modules 10x, 10y and 10z and the bonding surfaces 11a, 12a and 13a may be covered with a sealing resin, with only the ends of the drawn portions 11b, 12b and 13b being exposed.

The embodiments described above each show the collision detection sensors S1, S2 and S3 for respectively detecting acceleration in the x-, y- and z-axis directions. However, even when the present disclosure is applied to collision detection sensors for detecting acceleration in at least two directions, e.g. x- and y-axis directions in the aforementioned embodiments, identically shaped terminals and identically configured G modules can be used. Accordingly, it is not always necessary to provide three types of collision detection sensors so that acceleration in three directions can be detected.

The invention claimed is:

1. A collision detection sensor comprising:
a first sensor module, a second sensor module and a third sensor module which each include a first surface and a second surface facing each other, and an acceleration detection element detecting a vehicle acceleration in one direction, the second surface being formed with a first land and a second land;
a first terminal having a first bonding surface and a first drawn portion, the first bonding surface being bonded with the first land, the first drawn portion being drawn from the first bonding surface; and
a second terminal having a second bonding surface and a second drawn portion, the second bonding surface being bonded with the second land, the second drawn portion being drawn from the second bonding surface, wherein:
each of the first sensor module, the second sensor module and the third sensor module has a cuboid shape;

among four corners of the second surface, one corner in a first pair of opposing corners is provided with the first land, and the other corner in the first pair of opposing corners is provided with the second land;

among the four corners of the second surface, a second pair of opposing corners are provided with respective dummy terminals;

the first bonding surface is bonded with the first land and with one of the dummy terminals arranged on the second pair of opposing corners; and the second bonding surface is bonded with the second land and with the other of the dummy terminals arranged on the second pair of opposing corners.

2. The collision detection sensor as set forth in claim 1, wherein, the first and second bonding surfaces are arranged being juxtaposed;

the first sensor module detecting an acceleration in an x-axis direction of the vehicle is so arranged that the x-axis direction is perpendicular to the direction of arranging the first and second bonding surfaces; and the second sensor module created by rotating another first sensor module by 90 degrees to detect an acceleration in a y-axis direction of the vehicle is so arranged that the y-axis direction is parallel to the direction of arranging the first and second bonding surfaces.

3. A collision detection sensor comprising;

a first sensor module, a second sensor module, and a third sensor module which each include a first surface and a second surface facing each other, and an acceleration detection element detecting a vehicle acceleration in one direction, the second surface including an input terminal connected to a first bus, an output terminal connected to a second bus, and a return terminal connected to the first and second buses;

a first terminal which includes a first bonding surface and a first drawn portion, the first bonding surface being bonded with the input terminal, the first drawn portion being drawn from the first bonding surface;

a second terminal which includes a second bonding surface and a second drawn portion, the second bonding surface being bonded with the output terminal, the second drawn portion being drawn from the second bonding surface; and a third terminal which is arranged between the first and second terminals and which includes a third bonding surface bonded with the return terminal and a third drawn portion drawn from the third bonding surface, wherein:

among four corners of the second surface, one corner in a first pair of opposing corners is provided with the input terminal, and the other corner in the first pair of opposing corners is provided with the output terminal;

among the four corners of the second surface, a second pair of opposing corners are provided with respective dummy terminals;

the first bonding surface is bonded with the input terminal and with one of the dummy terminals arranged on the second pair of opposing corners; and the second bonding surface is bonded with the output terminal and with the other of the dummy terminals arranged on the second pair of opposing corners.

4. The collision detection sensor as set forth in claim 3, wherein, the first, second and third bonding surfaces are arranged being juxtaposed;

the first sensor module detecting an acceleration in an x-axis direction of the vehicle is so arranged that the x axis direction is perpendicular to the direction of arranging the first, second and third bonding surfaces; and the second sensor module created by rotating another first sensor module by 90 degrees to detect an acceleration in a y-axis direction of the vehicle is so arranged that the y-axis direction is parallel to the direction of arranging the first and second bonding surfaces.

5. A collision detection sensor comprising:

a sensor module which includes a first surface and a second surface facing each other, and an acceleration detection element detecting a vehicle acceleration in one direction, the second surface being formed with a first land and a second land;

a first terminal having a first bonding surface and a first drawn portion, the first bonding surface being bonded with the first land, the first drawn portion being drawn from the first bonding surface; and a second terminal having a second bonding surface and a second drawn portion, the second bonding surface being bonded with the second land, the second drawn portion being drawn from the second bonding surface, wherein:

the sensor module has a cuboid shape;

among four corners of the second surface, one corner in a first pair of opposing corners is provided with the first land, and the other corner in the first pair of opposing corners is provided with the second land;

among the four corners of the second surface, a second pair of opposing corners are provided with respective dummy terminals;

the first bonding surface is bonded with the first land and with one of the dummy terminals arranged on the second pair of opposing corners; and the second bonding surface is bonded with the second land and with the other of the dummy terminals arranged on the second pair of opposing corners.

6. The collision detection sensor as set forth in claim 5, wherein, the first and second bonding surfaces are arranged being juxtaposed;

the sensor module detecting an acceleration in an x-axis direction of the vehicle is so arranged that the x-axis direction is perpendicular to the direction of arranging the first and second bonding surfaces; and the sensor module detecting an acceleration in a y-axis direction of the vehicle is so arranged that the y-axis direction is parallel to the direction of arranging the first and second bonding surfaces.

7. A collision detection sensor comprising:

a sensor module which includes a first surface and a second surface facing each other, and an acceleration detection element detecting a vehicle acceleration in one direction, the second surface including an input terminal connected to a first bus, an output terminal connected to a second bus, and a return terminal connected to the first and second buses;

a first terminal which includes a first bonding surface and a first drawn portion, the first bonding surface being bonded with the output input terminal, the first drawn portion being drawn from the first bonding surface;

a second terminal which includes a second bonding surface and a second drawn portion, the second bonding surface being bonded with the output terminal, the second drawn portion being drawn from the second bonding surface; and a third terminal which is arranged between the first and second terminals and which includes a third bonding surface bonded with the return terminal and a third drawn portion drawn from the third bonding surface, wherein:

the sensor module has a cuboid shape;

among four corners of the second surface, one corner in a first pair of opposing corners is provided with the input terminal, and the other corner in the first pair of opposing corners is provided with the output terminal;

among the four corners of the second surface, a second pair of opposing corners are provided with respective dummy terminals;

the first bonding surface is bonded with the input terminal and with one of the dummy terminals arranged on the second pair of opposing corners; and the second bonding surface is bonded with the output terminal and with the other of the dummy terminals arranged on the second pair of opposing corners.

8. The collision detection sensor as set forth in claim 7, wherein, the first, second and third bonding surfaces are arranged being juxtaposed;

the sensor module detecting an acceleration in an x-axis direction of the vehicle is so arranged that the x-axis direction is perpendicular to the direction of arranging the first, second and third bonding surfaces; and the sensor module detecting an acceleration in a y-axis direction of the vehicle is so arranged that the y-axis direction is parallel to the direction of arranging the first and second bonding surfaces.

* * * * *